(12) United States Patent
Huang et al.

(10) Patent No.: US 10,775,237 B2
(45) Date of Patent: Sep. 15, 2020

(54) RESONANT WAVELENGTH MEASUREMENT APPARATUS AND MEASUREMENT METHOD THEREOF

(71) Applicant: NATIONAL CHIAO TUNG UNIVERSITY, Hsinchu (TW)

(72) Inventors: Cheng-Sheng Huang, Hsinchu (TW); Chih-Wei Chang, Taoyuan (TW); Shi-Ting Chen, Yuanshan Township, Yilan County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 15/960,828

(22) Filed: Apr. 24, 2018

(65) Prior Publication Data

US 2019/0242748 A1    Aug. 8, 2019

(30) Foreign Application Priority Data

Feb. 2, 2018   (TW) .............................. 107103889 A

(51) Int. Cl.
*G01J 3/12*      (2006.01)
*G01J 3/02*      (2006.01)
(Continued)

(52) U.S. Cl.
CPC . *G01J 3/12* (2013.01); *G01J 3/02* (2013.01); *G01J 3/2803* (2013.01);
(Continued)

(58) Field of Classification Search
CPC .... G01J 3/12; G01J 3/02; G01J 3/2803; G01J 2003/1226; G01J 2003/282; G01N 21/7743
See application file for complete search history.

(56) References Cited

U.S. PATENT DOCUMENTS 7,583,863 B2   9/2009   Fouquet et al.
8,247,240 B2   8/2012   Pien et al.
(Continued)

FOREIGN PATENT DOCUMENTS

CN   104165864 A   11/2014
CN   106482831 A   3/2017
(Continued)

OTHER PUBLICATIONS

Resonant Wavelength Shift Detection System Based on a Gradient Grating Period Guided-Mode Resonance. IEEE Photonics Journal 10.4 (2018): 1-10 (Year: 2018).*
(Continued)

*Primary Examiner* — Dominic J Bologna
(74) *Attorney, Agent, or Firm* — Birch, Stewart, Kolasch & Birch, LLP

(57) ABSTRACT

Disclosed is a resonant wavelength measurement apparatus, including a light source and a measurement unit. The measurement unit has a guided-mode resonance filter and a photosensitive element. The guided-mode resonance filter has a plurality of resonant areas, and each resonant area has a different filtering characteristic, to receive first light in the light source transmitted by a sensor or receive second light in the light source reflected by the sensor. The first light has a first corresponding pixel on the photosensitive element, the second light has a second corresponding pixel on the photosensitive element, and the first corresponding pixel and the second corresponding pixel correspond to a same resonant wavelength.

10 Claims, 16 Drawing Sheets

(51) Int. Cl.
*G01N 21/77* (2006.01)
*G01J 3/28* (2006.01)

(52) U.S. Cl.
CPC .. *G01N 21/7743* (2013.01); *G01J 2003/1226* (2013.01); *G01J 2003/282* (2013.01)

(56) References Cited

U.S. PATENT DOCUMENTS

| | | | |
|---|---|---|---|
| 10,012,535 | B2 | 7/2018 | Huang et al. |
| 2002/0076154 | A1* | 6/2002 | Maisenhoelder .... G01N 21/552 385/37 |
| 2004/0223881 | A1 | 11/2004 | Cunningham et al. |
| 2008/0062418 | A1* | 3/2008 | Magnusson .......... G01N 21/253 356/307 |
| 2011/0090931 | A1* | 4/2011 | Murata ................. B82Y 20/00 372/50.11 |
| 2014/0080729 | A1 | 3/2014 | Grego et al. |
| 2017/0059405 | A1* | 3/2017 | Huang ................. G01J 3/0205 |
| 2018/0202928 | A1 | 7/2018 | Abdulhalim |

FOREIGN PATENT DOCUMENTS

| | | |
|---|---|---|
| TW | I380117 B | 12/2012 |
| TW | I541493 B | 7/2016 |
| WO | WO 2017/033184 A1 | 3/2017 |

OTHER PUBLICATIONS

"Pixel." Merriam-Webster.com Dictionary, Merriam-Webster, https://www.merriam-webster.com/dictionary/pixel. Accessed Mar. 9, 2020 (Year: 2020).*
C. Chang, S. Chen, Y. Lin and C. Huang, "Resonant Wavelength Shift Detection System Based on a Gradient Grating Period Guided-Mode Resonance," in IEEE Photonics Journal, vol. 10, No. 4, pp. 1-10, Aug. 2018, (Year: 2018).*
Cunningham et al., "Label-Free Assays on the Bind System," J Biomol Screen, vol. 9, No. 6, 2004, pp. 481-490 (11 pages total).
DeVos et al., "Silicon-on-Insulator Microring Resonator for Sensitive and Label-Free Biosensing," Opctics Express, vol. 15, No. 12, Jun. 11, 2007, pp. 7610-7615.
Guo et al., "Real-Time Biomolecular Binding Detection Using a Sensitive Photonic Crystal Biosensor," Anal. Chem., vol. 82, No. 12, Jun. 15, 2010, pp. 5211-5218.
Kim et al., "Polymer Waveguide Label-Free Biosensors With Enhanced Sensitivity by Incorporating Low-Refractive-Index Polymers," IEEE Journal of Selected Topics in Quantum Electronics, vol. 16, No. 4, Jul./Aug. 2010, pp. 973-980.
Liang et al., "Highly sensitive fiber Bragg grating refractive index sensors," Appl. Phys. Lett., vol. 86, 2005 (published online Apr. 8, 2005) pp. 151122-1-151122-3.
Mateus et al., "Ultra Compact, High Sensitivity Label-Free Biosensor Using VCSEL," Conference on Lasers and Electro-Optics, 2003, 2 pages.
Mateus et al., "Ultra-Sensitive Immunoassay using VCSEL Detection System," Electronics Letters, May 27, 2004, vol. 40, No. 11, 2 pages.
Smith et al., "Surface-Relief Fiber Bragg gratings for Sensing Applications," Applied Optics, vol. 45, No. 8, Mar. 10, 2006, pp. 1669-1675.
Tan et al., "Plastic-Based Distributed Feedback Laser Biosensors in Microplate Format," IEEE Sensors Journal, vol. 12, No. 5, May 2012, pp. 1174-1180.
Zhang et al., "A Self-Referencing Biosensor Based upon a Dual-Mode External Cavity Laser," Appl. Phys. Lett., vol. 102, 2013 (published online May 28, 2013), pp. 213701-1-213703-4 (5 pages total).
Zhao et al., Fiber Optic SPR Sensor for Liquid Concentration Measurement, Sensors and Actuators B: Chemical, vol. 192, 2014 (published online Nov. 1, 2013), pp. 229-233.

* cited by examiner

RESONANT WAVELENGTH MEASUREMENT APPARATUS AND MEASUREMENT METHOD THEREOF

BACKGROUND OF THE INVENTION

1. Field of the Invention

The present invention relates to a resonant wavelength measurement apparatus and a measurement method thereof, and in particular, to a miniaturized resonant wavelength measurement apparatus and a measurement method thereof.

2. Description of the Prior Art

With the improvement of the medical system, convenient and rapid biosensing has become a trend. Among different biosensors based on different detection mechanisms, the optical biosensor is the most widely used. The concentration of a target analyte can be obtained by measuring changes in different parameters depending on the design of biosensors, such as light intensity, a wavelength, and a coupling angle. Among them, it is the most common to measure a change in a resonant wavelength. Based on different sensing mechanisms and setup of a measurement apparatus, the resonant wavelength may be presented by a peak or a valley. Currently, the most common manner is to measure a spectrum by using a spectrometer to obtain the change in the resonant wavelength.

However, the spectrometer has a large size and is costly, and cannot be integrated with a sensor chip to miniaturize the whole sensing system.

SUMMARY OF THE INVENTION

In view of this, one objective of the present invention is to provide a resonant wavelength measurement apparatus, to develop, through numerical processing by using a gradient guided-mode resonance element in combination with a linear charge-coupled device (CCD), an apparatus can be used to observe a resonant wavelength change.

The resonant wavelength measurement apparatus includes a light source and a measurement unit. The measurement unit has a guided-mode resonance filter and a photosensitive element. The guided-mode resonance filter has a plurality of resonant areas, and each resonant area has a different filtering characteristic, and the guided-mode resonance filter is used to receive a first light transmitted by a sensor or receive second light reflected by the sensor. Wherein when the first light is incident to the guided-mode resonance filter, a first corresponding pixel is determined by measuring intensity distribution on the photo sensitive element; wherein when the second light is incident to the guided-mode resonance filter, a second corresponding pixel is determined by measuring the intensity distribution on the photosensitive element; wherein the first corresponding pixel and the second corresponding pixel correspond to the same resonant wavelength.

Another objective of the present invention is to provide a resonant wavelength measurement method, to develop, through numerical processing by using a gradient guided-mode resonance element in combination with a linear CCD, a method that can be used to observe a resonant wavelength change.

The measurement method includes the following steps: (S1) illuminating a sensor with a light source; (S2) transmitting a first light transmitted by the sensor or a second light reflected by the sensor into a measurement unit, wherein the light source includes the first light and the second light, and the measurement unit includes a guided-mode resonance filter and a photosensitive element connected to the guided-mode resonance filter, wherein the guided-mode resonance filter has a plurality of resonant areas, and each resonant area has a different filtering characteristic; and (S3) injecting the first light into the guided-mode resonance filter so as to determine a first corresponding pixel by measuring intensity distribution on the photosensitive element, and injecting the second light into the guided-mode resonance filter so as to determine the second corresponding pixel by measuring the intensity distribution on the photosensitive element, wherein the first corresponding pixel and the second corresponding pixel correspond to a same resonant wavelength.

Additional features and advantages of the present invention will be set forth in the following description, and will be apparent from the description, or may be learned by practice of the present invention. Other objectives and advantages of the present invention will be achieved by the structure described in the specification and the claims, as well as in the accompanying drawings.

DETAILED DESCRIPTION OF THE PREFERRED EMBODIMENT

Figure 1A:
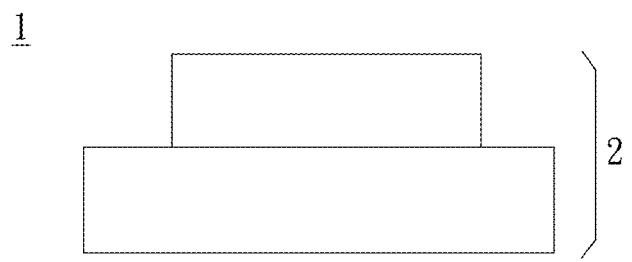
FIG. 1A is a schematic diagram of an embodiment of a resonant wavelength measurement apparatus according to the present invention.
Figure 1A:
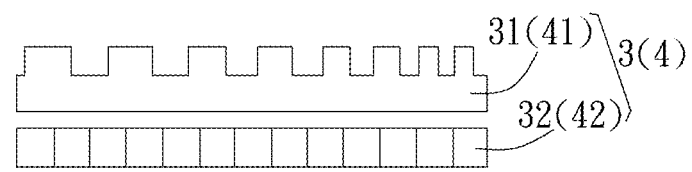
Figure 1B:
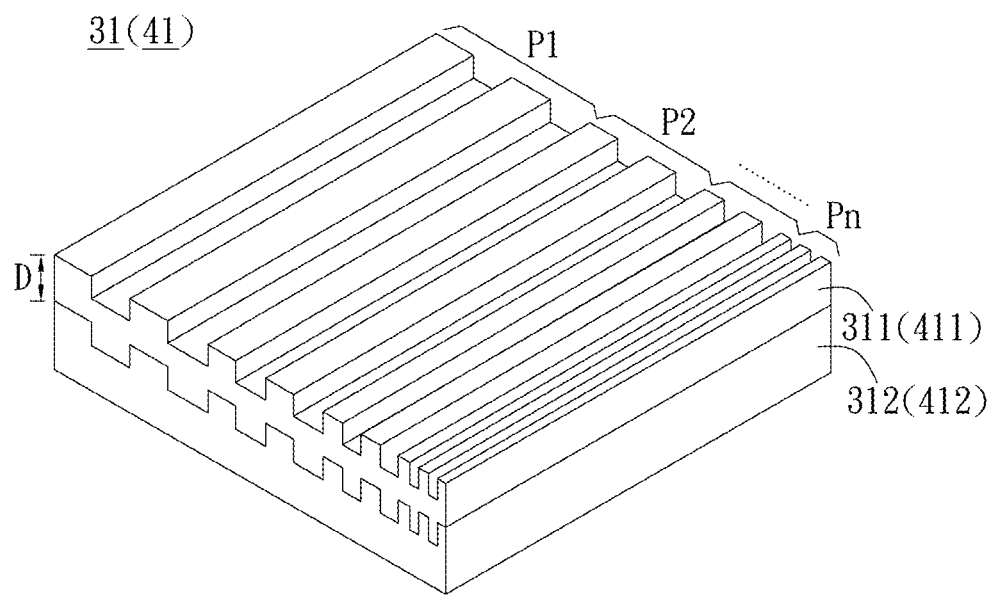
FIG. 1B is a three-dimensional diagram of an embodiment of a guided-mode resonance filter according to the present invention.

Refer to FIG. 1A and FIG. 1B. A resonant wavelength measurement apparatus 1 includes a light source 2 and a measurement unit 3, 4. The measurement unit 3, 4 has a guided-mode resonance filter 31, 41 and a photosensitive element 32, 42 connected to the guided-mode resonance filter.

Specifically, the guided-mode resonance filter 31, 41 has a plurality of resonant areas $P_1, P_2, \ldots, P_n$, whose resonant frequencies gradually decrease or increase along a direction. In this embodiment, for example, a periodic gradient changes from 250 nm to 550 nm in unit of 2 nm, but the present invention is not limited thereto, and the range of the periodic gradient and the repetition times of each period may be adjusted based on different applications. Particularly, each resonant area has a different filtering characteristic, to transmit or reflect light of a particular wavelength. That is, a gradient guided-mode resonance filter is used in this embodiment. For example, each resonant area is arranged with a different grating period along a direction perpendicular to the light source; or each resonant area is arranged with a different waveguide thickness along a direction perpendicular to the light source; or each resonant area is arranged with a different refractive index along a direction perpendicular to the light source.

In this embodiment, the guided-mode resonance filter 31, 41 may be a waveguide grating structure formed by arranging a dielectric layer 311, 411 on a light transmission layer 312, 412, where a refractive index of the dielectric layer 311, 411 is greater than a refractive index of the light transmission layer 312, 412. For example, the dielectric layer 311, 411 may be made of titanium dioxide ($TiO_2$), silicon nitride ($SiN_x$), zinc oxide (ZnO), zirconium dioxide ($ZrO_2$), tantalum pentoxide ($Ta_2O_5$), niobium pentoxide ($Nb_2O_5$), or strontium dioxide ($HfO_2$). The light transmission layer 312, 412 may be made of glass, quartz, or plastic. However, for different bands, the dielectric layer 311, 411 and the light transmission layer 312, 412 may be made of different materials.

The principle is illustrated below. As shown in FIG. 2A to FIG. 2D, mainly, spectral information of incident light is converted into spatial information on the photosensitive element, for example, a CCD, by using the guided-mode resonance structure having a periodic gradient. To implement this idea, the guided-mode resonance structure having a periodic gradient is mounted on a linear photosensitive element, and a relationship between a wavelength of the incident light and a pixel is obtained by using a monochromator. In another embodiment, a CCD of a two-dimensional structure may be used, and no particular limitation is set thereto. When light of a particular wavelength is incident to the guided-mode resonance structure having a periodic gradient, resonance occurs at a particular location, and the light of the particular wavelength is reflected back at this location, while light at another location is transmitted.

Figure 2A:
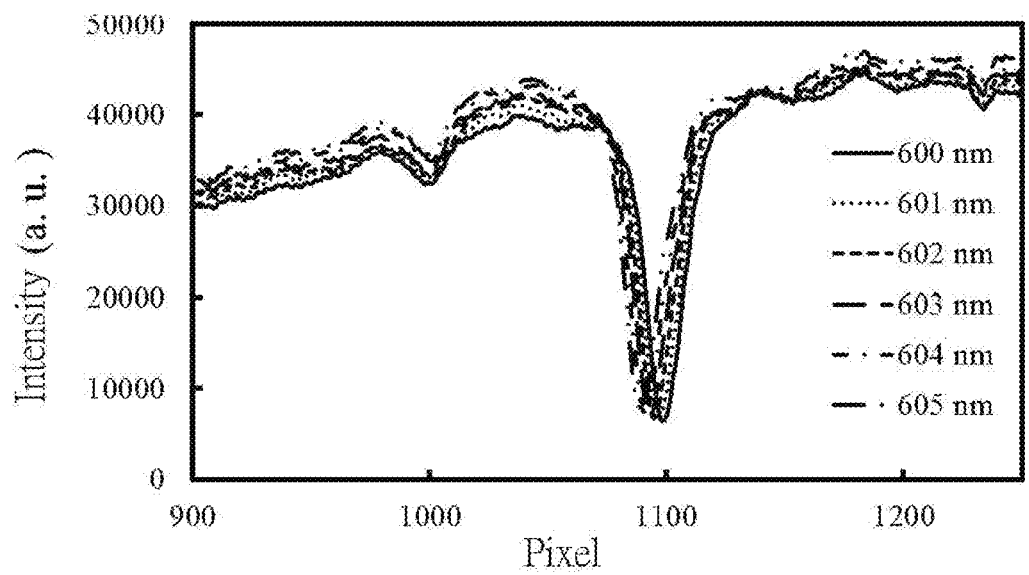
FIG. 2A is a distribution diagram of light intensity measured on a photosensitive element for an incident wavelength.
Figure 2B:
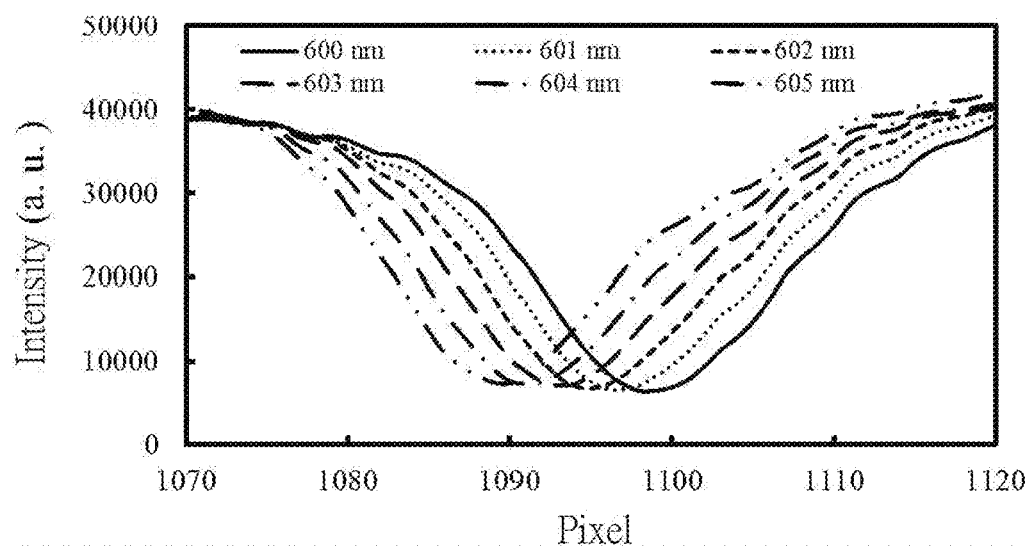
FIG. 2B is a partial enlarged view of a resonant valley location.
Figure 2C:
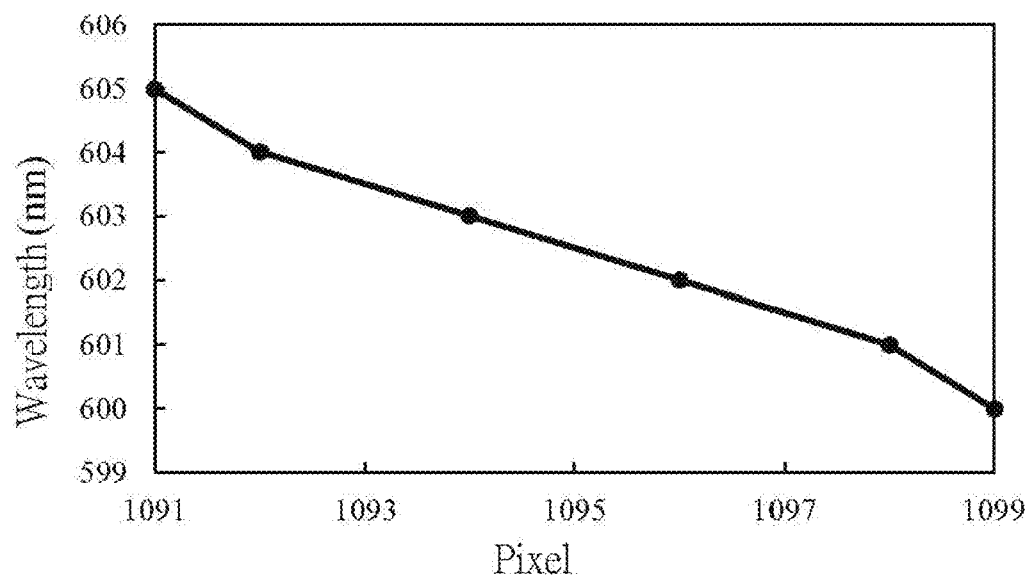
FIG. 2C is a relationship diagram between a resonant wavelength and a resonant pixel.
Figure 2D:
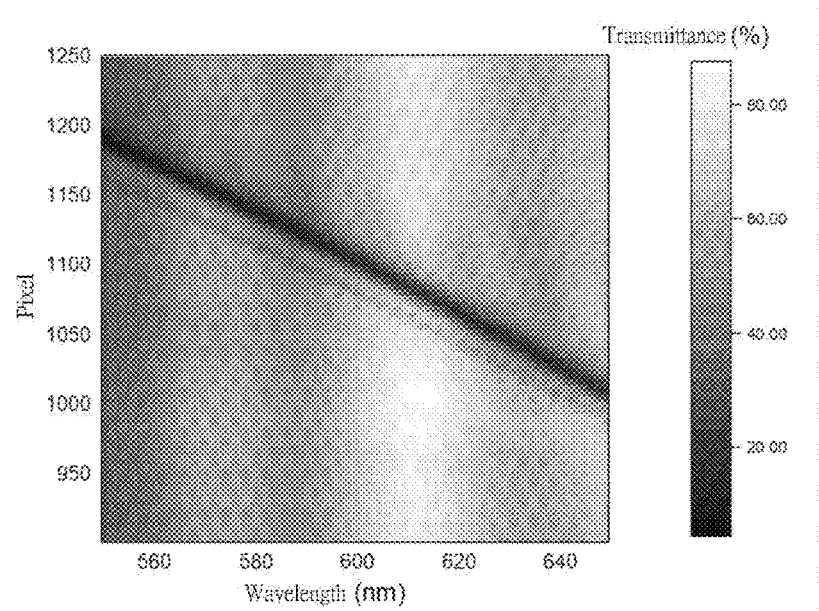
FIG. 2D is a transmittance diagram between each resonant pixel and a wavelength.

FIG. 2A and FIG. 2B show distribution of light intensity measured on the photosensitive element with an incident wavelength of 600 nm to 605 nm. FIG. 2B is a partial enlarged view of a valley, from which it can be seen that each wavelength has a corresponding pixel (referred to as a resonant pixel) corresponding to minimum measured light intensity. FIG. 2C is a relationship diagram between a resonant pixel and an incident wavelength, from which it can be seen that the guided-mode resonance filter can distinguish light differed by 1 nm. FIG. 2D is a transmittance relationship diagram between a particular wavelength and a particular pixel. In this example, a monochromator is used to input light of a particular wavelength, starting from 550 nm and gradually increasing to 660 nm in unit of 1 nm.

FIG. 2D may be represented by a transmittance matrix T, T is a square j☐j matrix, the first subscript represents a resonant pixel, and the second subscript represents a particular wavelength for calculation. Actually, each value in the T matrix represents transmittance of a particular wavelength at a particular resonant pixel. For all incident spectrums, light may be split as $I_j$, whose subscript represents a particular wavelength for calculation (or calibration). Therefore, a result of light intensity received by the photosensitive element may be calculated based on C=TI, where $C_j$ represents light intensity received by each resonant pixel.

A broadband light source illuminates a sensor. The sensor in this embodiment is, for example, a guided-mode resonance biosensor, but the present invention is not limited thereto. In another embodiment, another optical biosensor may be used. When resonance occurs at a particular wavelength from the light source at the sensor, the wavelength is reflected back, while light at other wavelengths where resonance does not occur are transmitted through the sensor.

Figure 3A:
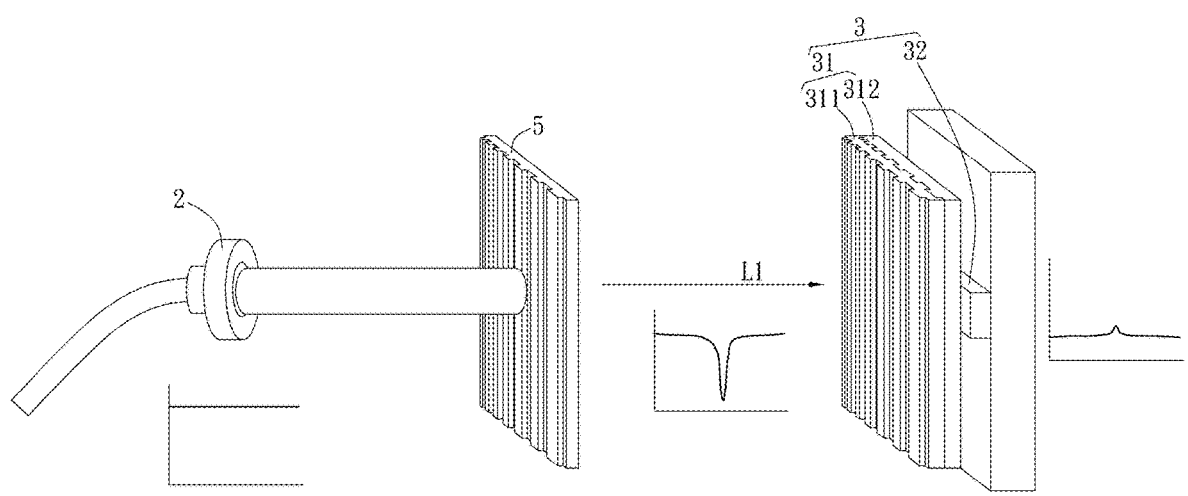
FIG. 3A is a schematic diagram of an embodiment of resonant wavelength measurement according to the present invention.

For an embodiment of the present invention, refer to FIG. 3A. In this embodiment, the transmitted light is defined as first light L1. In this case, the transmitted first light L1 is light having a valley spectrum. When the first light L1 is incident to the guided-mode resonance filter 31, and intensity distribution is generated by the photosensitive element 32, and a first corresponding pixel having a peak spectrum is determined by measuring the intensity distribution on the photosensitive element 32. It should be noted that, in this case, the first light L1 is measured by the measurement unit 3, and the measurement unit 3 in this embodiment is preferably arranged on a side of the sensor 5 opposite to the light source 2. Correspondingly, it can be learned with reference to FIG. 2D that, a wavelength corresponding to a pixel corresponding to this peak is a resonant wavelength of the sensor. That is, the apparatus in this embodiment may obtain the resonant wavelength of the sensor 5 based on a pixel corresponding to a valley measured on the photosensitive element 32 and a relationship diagram (that is, FIG. 2D) between a resonant pixel and a resonant wavelength. In another embodiment, the first light L1 may have a peak, and the first corresponding pixel is a valley, which is determined by the characteristic of the sensor 5, and has no particular form.

Figure 3B:
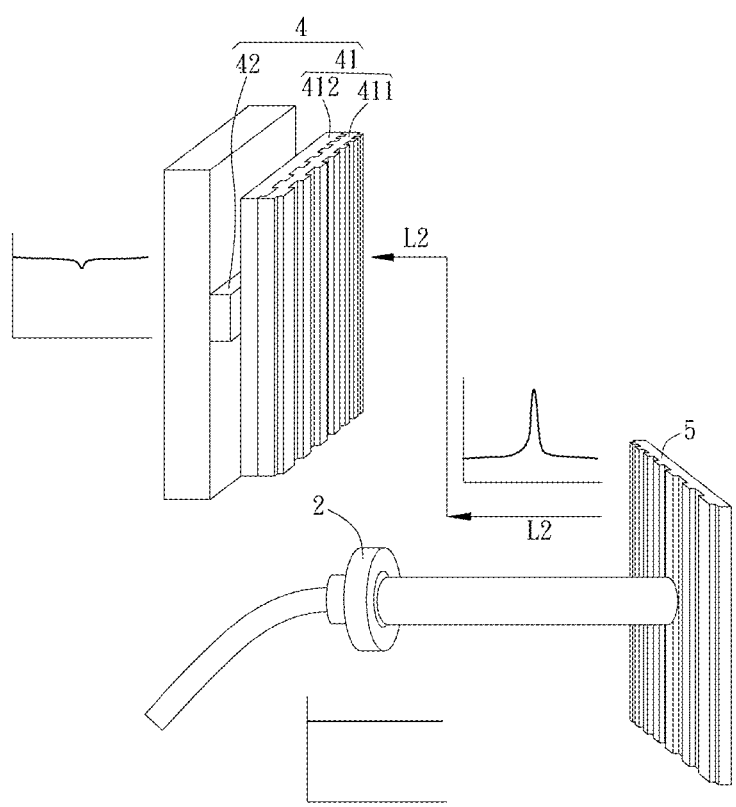
FIG. 3B is a schematic diagram of another embodiment of resonant wavelength measurement according to the present invention.

For an embodiment, refer to FIG. 3B. In this embodiment, light reflected by the sensor 5 is defined as second light L2, and the second light L2 is light having a peak spectrum. When the second light L2 is incident to the guided-mode resonance filter 41, and intensity distribution is generated by the photosensitive element 42, a second corresponding pixel having a valley spectrum is determined by measuring the intensity distribution on the photosensitive element 42. It should be noted that, in this case, the second light L2 is measured by the measurement unit 4, and the measurement unit 4 in this embodiment is preferably arranged on a side of the sensor 5 close to the light source 2. Correspondingly, it can be learned with reference to FIG. 2D that, a wavelength corresponding to a pixel corresponding to this valley is a resonant wavelength of the sensor 5, and the first corresponding pixel and the second corresponding pixel correspond to a same resonant wavelength. In another embodiment, the second light L2 may have a valley, and the second corresponding pixel is a peak, which is determined by the characteristic of the sensor 5, and has no particular form.

Next, refer to FIG. 4A to FIG. 4E. It is assumed that resonant wavelengths at all resonant pixels correspond to same transmittance (for example, 0.1, that is, 10% transmittance), and other wavelengths also correspond to same transmittance (for example, 1, that is, 100% transmittance). Therefore, intensity of incident light is represented by $I_j$, and then intensity ($C_j$) of each resonant pixel on the photosensitive element may be calculated based on C=TI, an equation of which is as follows:

$$\begin{bmatrix} C_1 \\ \cdot \\ \cdot \\ \cdot \\ C_x \\ \cdot \\ \cdot \\ \cdot \end{bmatrix} = \begin{bmatrix} 0.1 & 1 & 1 & 1 & 1 & 1 & 1 \\ & & & \cdot & & & \\ & & & \cdot & & & \\ & & & \cdot & & & \\ 1 & 1 & 1 & 0.1 & 1 & 1 & 1 \\ & & & \cdot & & & \\ & & & \cdot & & & \\ 1 & 1 & 1 & 1 & 1 & 1 & 0.1 \end{bmatrix} \begin{bmatrix} I_1 \\ \cdot \\ \cdot \\ \cdot \\ I_x \\ \cdot \\ \cdot \\ \cdot \end{bmatrix} \quad \text{(Eq. 1)}$$

Figure 4A:
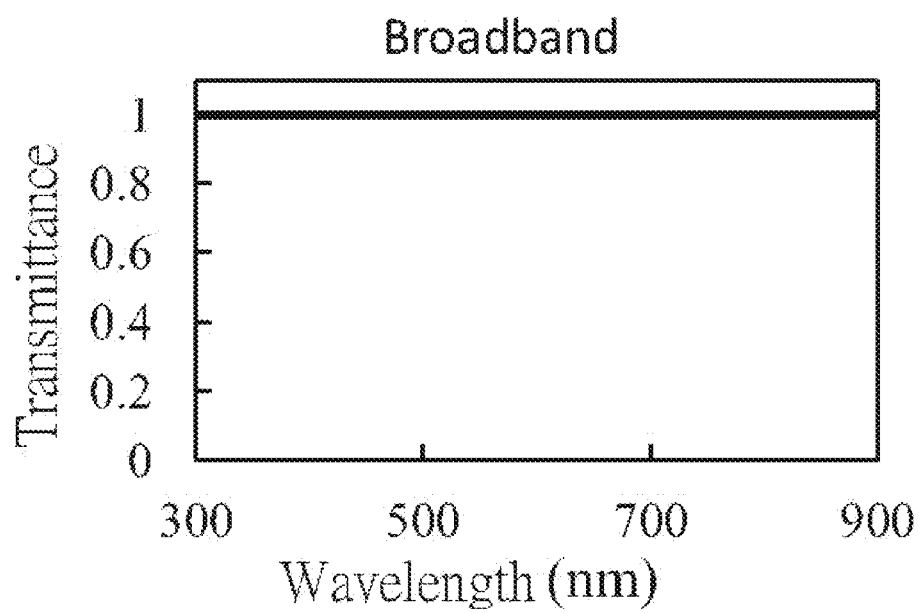
FIG. 4A-FIG. 4E are schematic diagrams of an operating mechanism of resonant wavelength measurement according to the present invention.
Figure 4B:
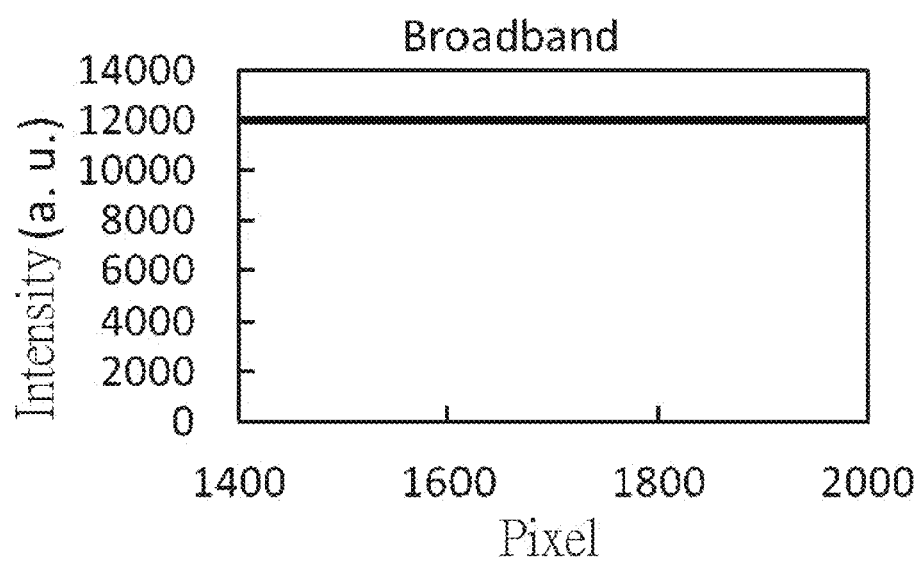

In addition, it is assumed that broadband light (FIG. 4A, it is assumed that intensity is 1, that is, $I_j=1$) is incident to the guided-mode resonance filter, and intensity of each resonant pixel on the photosensitive element is shown in FIG. 4B, that is, all pixels on the photosensitive element have same intensity (all $C_j$ is the same). However, when the broadband light first passes through a sensor and a spectrum having a valley is obtained, this valley corresponds to an $x^{th}$ resonant wavelength, and $I_x=0.1$ (it is assumed that transmittance is 0.1), while intensity of another pixel $I_j$ (j=1 . . . n, but j≠x) is 1 (it is assumed that transmittance is 100% in a non-resonant area). Therefore, on the photosensitive element, according to Eq. 1, intensity measured at the resonant pixel ($C_x$) is $C_x=1+1+ \ldots 0.1\times0.1+1+ \ldots 1$ (Eq. 2), while intensity at a non-resonant pixel (for example, $C_1$) is $C_1=0.1\times1+1+ \ldots 1\times0.1+1+ \ldots 1$ (Eq. 3).

Figure 4C:
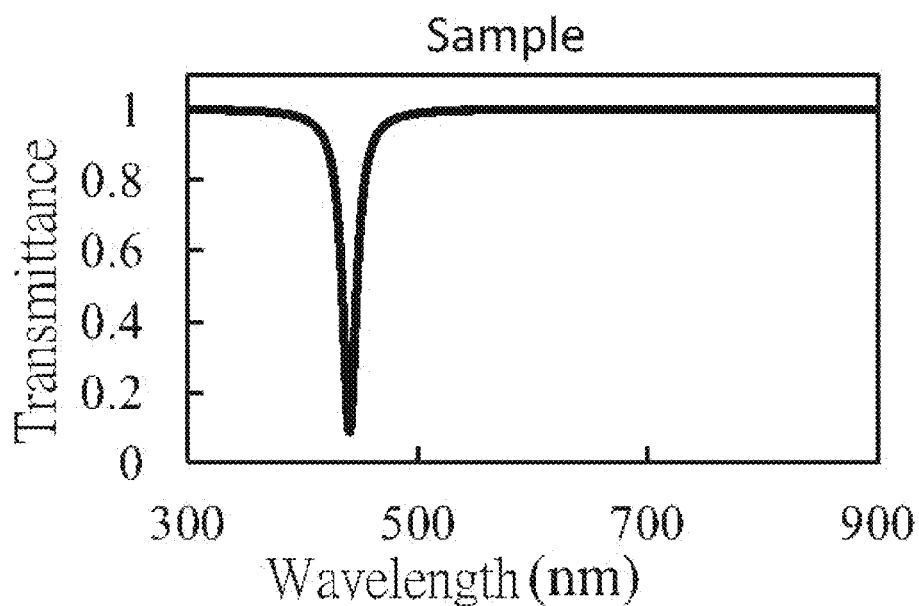

It can be learned from Eq. 2 and Eq. 3 that, intensity ($C_x$) at a resonant pixel is greater than intensity (for example, $C_1$) at a non-resonant pixel. Therefore, a spectrum having a peak (that is, FIG. 4D) is obtained on the photosensitive element through measurement. Then, according to FIG. 2D, a pixel corresponding to the peak is the resonant wavelength (a wavelength at a valley in this case, as shown in FIG. 4C) generated by the sensor.

Figure 4D:
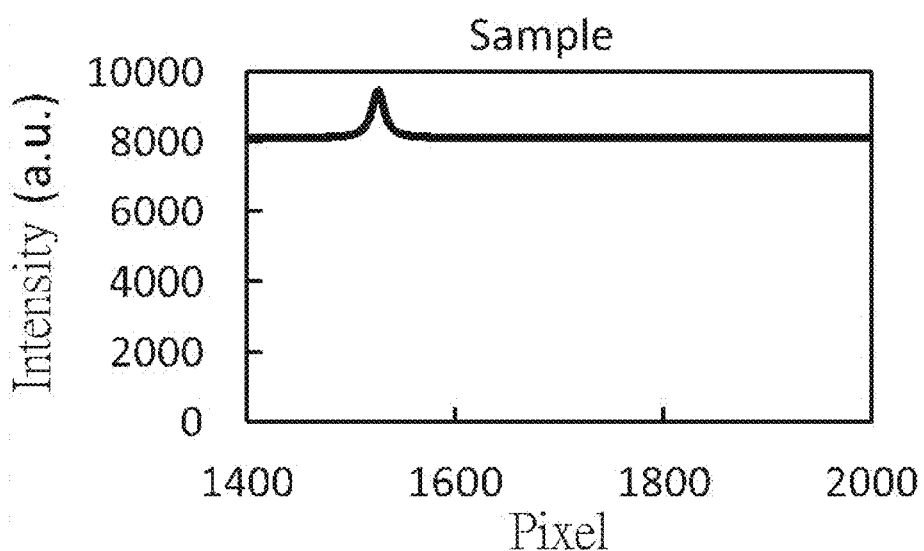
Figure 4E:
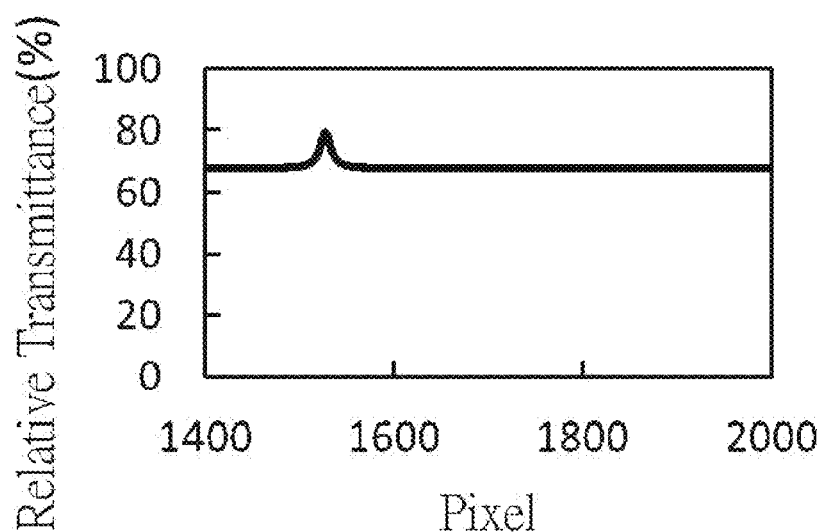

It should be noted that, because the light source does not have uniform intensity with respect to different wavelengths and does not have uniform transmittance at non-resonant pixels, different wavelengths have different transmittance at respective corresponding resonant pixels. To overcome this problem, intensity distribution (as shown in FIG. 4D) on the photosensitive element measured after the light from the light source passes through the sensor and the guided-mode resonance filter 3 is divided by intensity distribution (as shown in FIG. 4B) on the photosensitive element measured after the light from the light source directly enters the guided-mode resonance filter 3. In this way, a relationship diagram in FIG. 4E between relative transmittance and a pixel may be obtained. Then according to FIG. 2D, a pixel corresponding to a peak in FIG. 4E is a resonant wavelength (that is, FIG. 4C) generated by the sensor.

Therefore, the resonant wavelength of the sensor may be deduced from the relationship diagram (that is, FIG. 4E) obtained through measurement between relative transmittance and a pixel and the previous transmittance diagram (that is, FIG. 2D) obtained through correction between a resonant pixel and a wavelength.

Figure 5A:
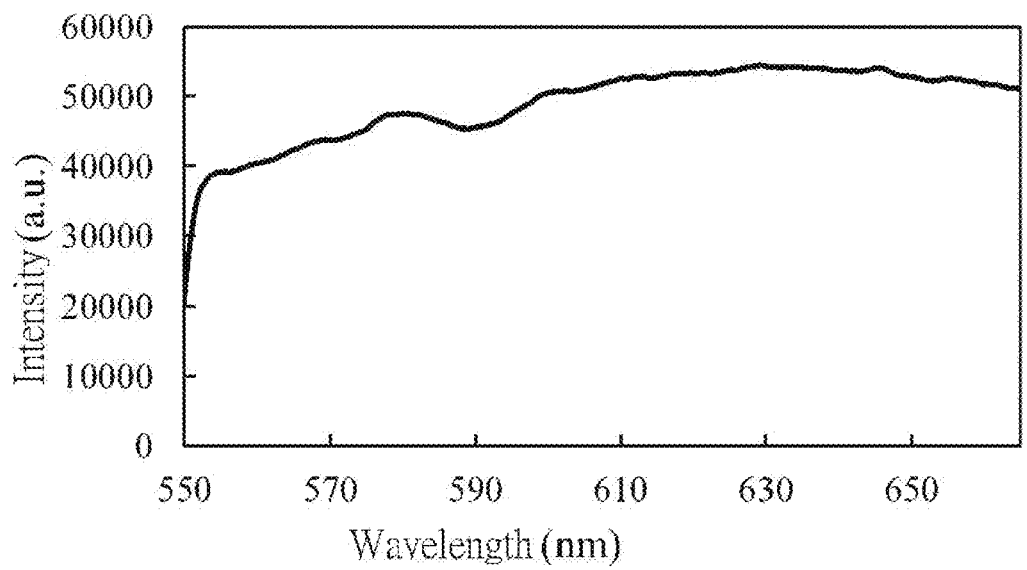
FIG. 5A-FIG. 5D are relationship diagrams of experimental data verifying the present invention.
Figure 5B:
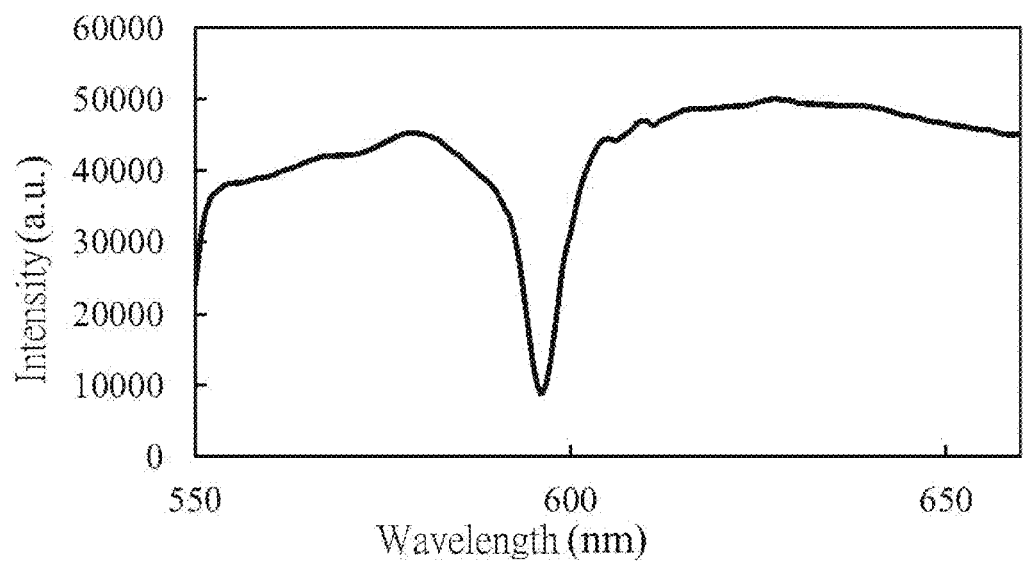
Figure 5C:
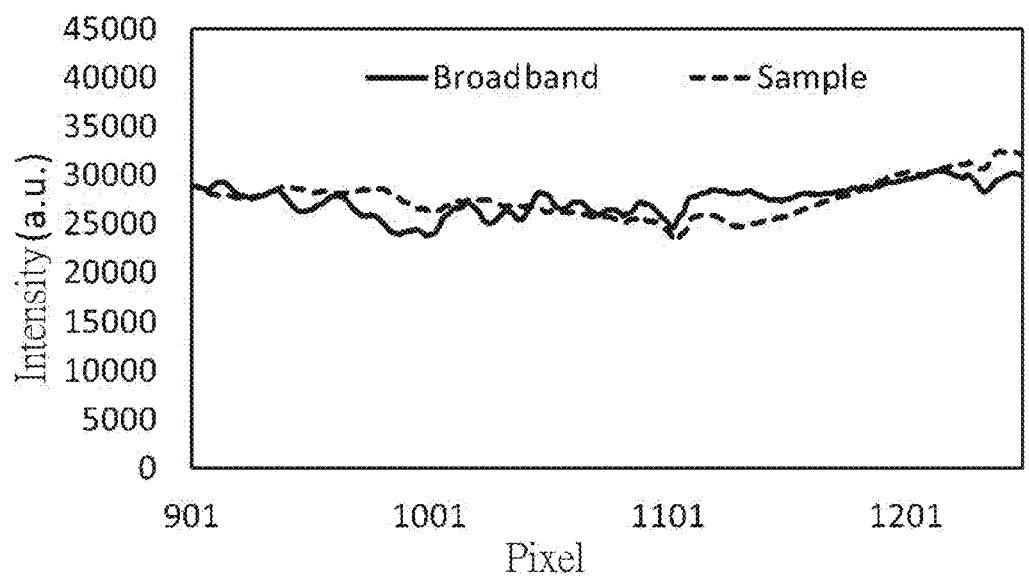
Figure 5D:
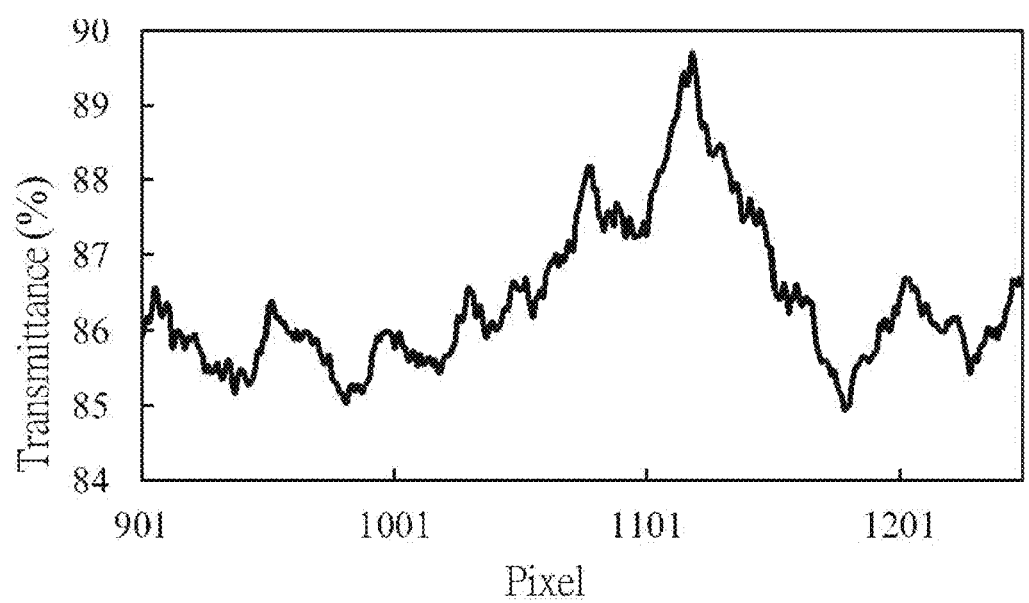

The foregoing embodiment may be verified by the following experiment, referring to FIG. 5A to FIG. 5D. A light source used has a spectrum shown in FIG. 5A, and is a broadband light source resonant in a TM polarization. A transmittance spectrum of a sensor (using a GMR biosensor as an example, but the present invention is not limited thereto) is measured by using a commercially available spectrometer, and from FIG. 5B, it can be learned that a resonant wavelength is 592 nm. The resonant wavelength measurement apparatus is used to separately measure light intensity distribution in a case where the sensor is arranged and in a case where no sensor is arranged. Results are shown in FIG. 5C. Results for the case where the sensor is arranged and the case where no sensor is arranged are respectively represented by sample and broadband. Finally, relative transmittance of pixels may be obtained through calculation, as shown in FIG. 5D, and a transmittance peak corresponds to a pixel 1120. From the relationship shown in FIG. 2D between a resonant pixel and a wavelength, it can be deduced that a wavelength corresponding to the pixel is 592 nm. This result is consistent with a measurement result of the commercially available spectrometer.

This verification result shows that, with respect to the valley formed due to the sensor, intensity distribution having a peak is formed on the resonant wavelength measurement apparatus, and after calibration (that is, FIG. 2D) between a resonant wavelength and a resonant pixel, a pixel corresponding to the peak on the photosensitive element may be converted to a corresponding resonant wavelength.

Figure 6A:
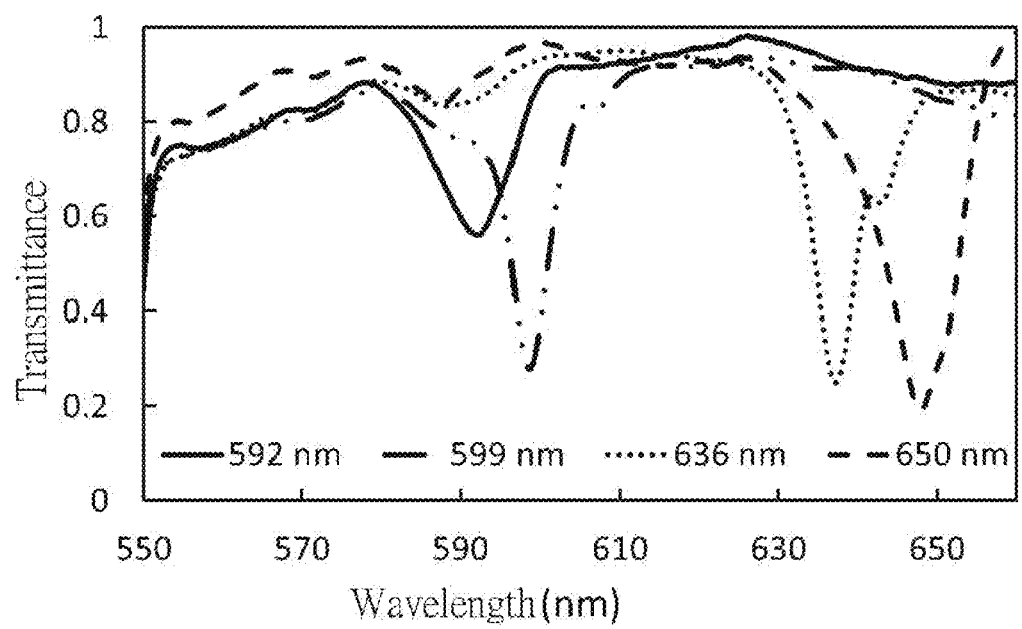
FIG. 6A-FIG. 6B are relationship diagrams of experimental data verifying the present invention.
Figure 6B:
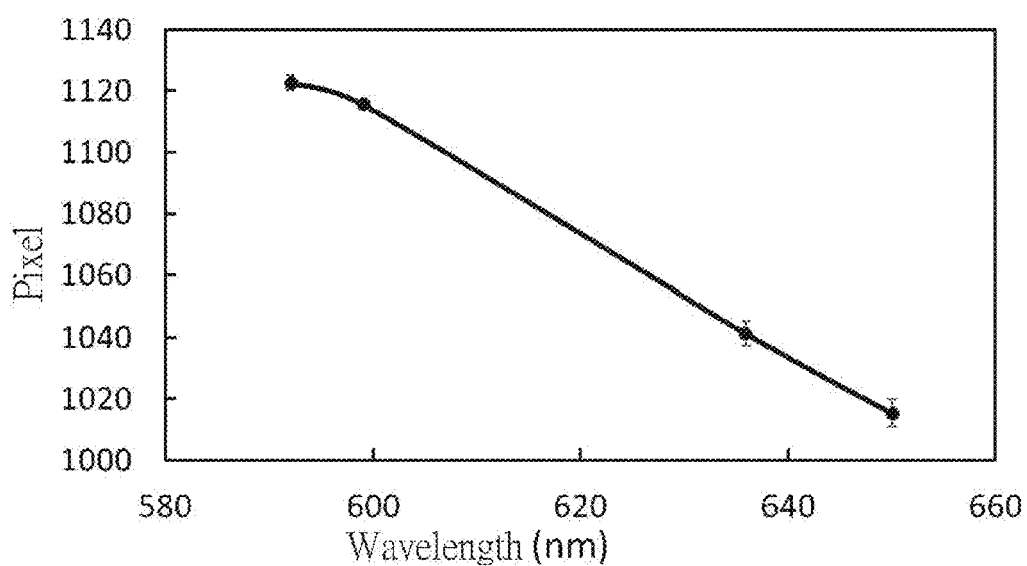

In addition, to further verify this idea, GMR biosensors of four different resonant wavelengths (592 nm, 599 nm, 636 nm, 650 nm) are used for measurement. Their transmittance spectrums are shown in FIG. 6A. In this experiment, the GMR biosensors perform measurement in ascending order of the resonant wavelengths. Measurement steps are the same as above, and repeated three times. Measurement results show that, a peak of relative transmittance truly corresponds to a valley wavelength of a GMR biosensor, as shown in FIG. 6B.

For another verification manner of the present invention, refer to FIG. 7A to FIG. 7D. For use of an optical biosensor, because different sample concentrations cause different refractive indexes, a resonant wavelength shift is caused. To further verify the resonant wavelength measurement apparatus in the present invention, samples of different concentrations are used for tests. In this experiment, a GMR biosensor is also used as a sensor, and sucrose of different concentrations are used as test samples.

Figure 7A:
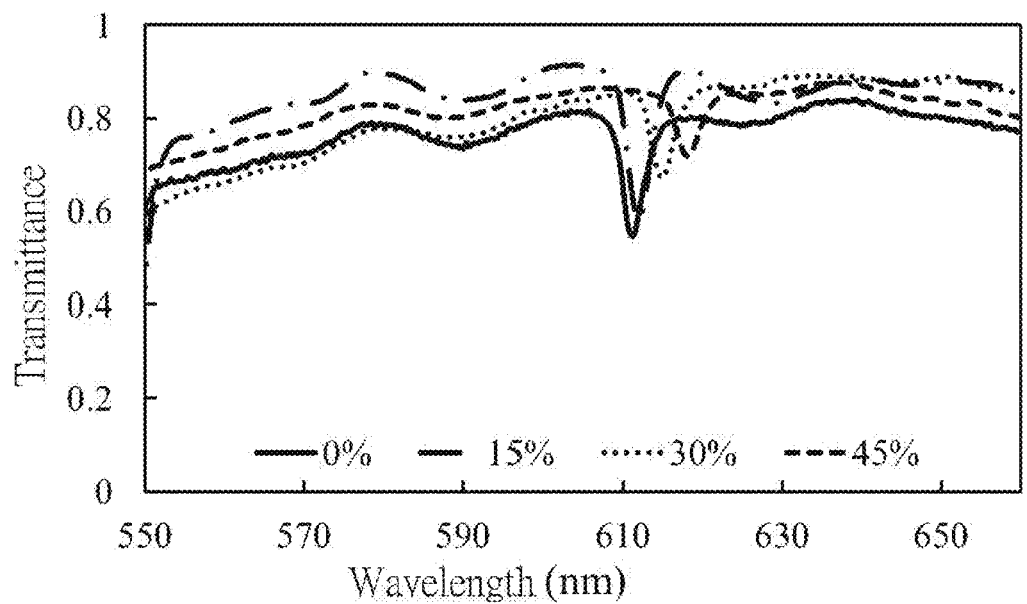
FIG. 7A-FIG. 7D are relationship diagrams of experimental data verifying the present invention.
Figure 7B:
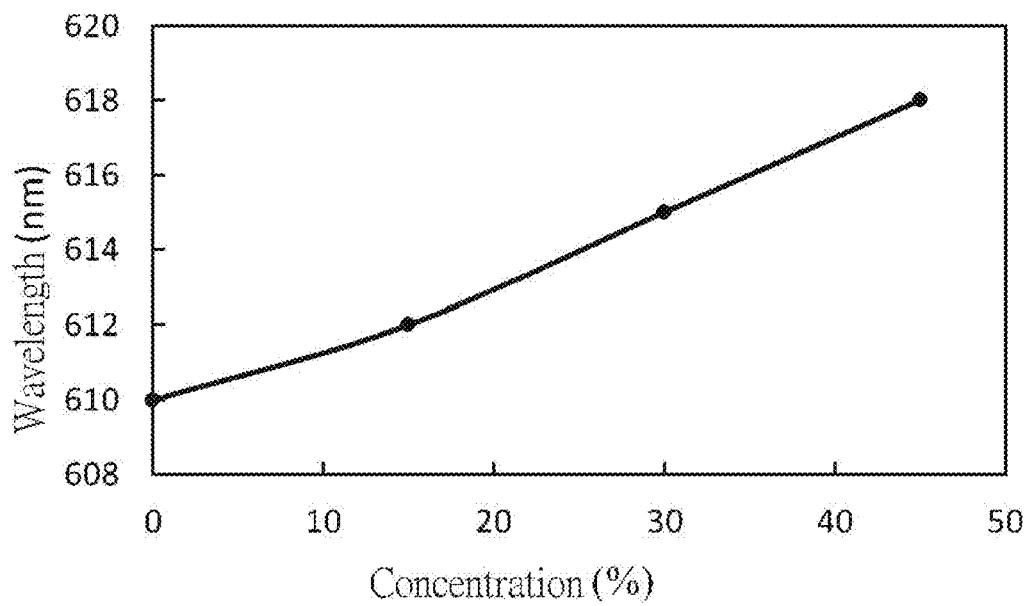

First, a commercially available spectrometer is used to separately measure transmittance spectrums and valley locations of samples of different concentrations dripping on the GMR biosensor, as shown in FIG. 7A. sucrose of concentrations 0%, 15%, 30%, and 45% respectively have resonant wavelengths of 611.3 nm, 612 nm, 615.1 nm, and 618.21 nm, and a relationship between a concentration and a resonant wavelength is shown in FIG. 7B.

Next, the resonant wavelength measurement apparatus is used to measure a valley. First, a signal received by the photosensitive element when broadband light illuminates the guided-mode resonance filter (without a sample solution) is used as a reference signal. Then, light intensity received by the photosensitive element when samples of different concentrations dripping on the GMR biosensor is measured. Finally, a peak of relative transmittance and a corresponding pixel can be obtained by performing an operation on the reference signal and the light intensity.

Figure 7C:
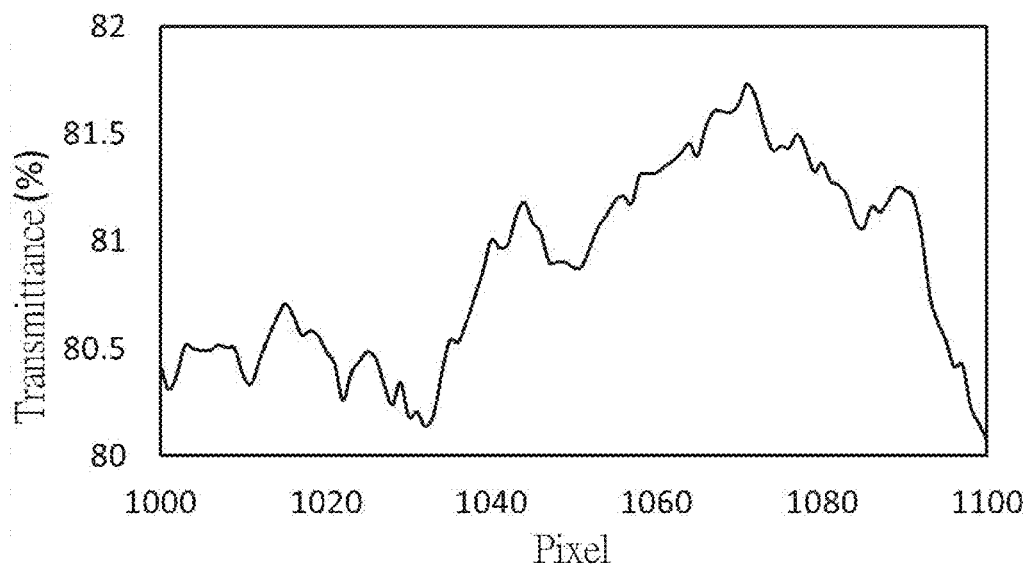
Figure 7D:
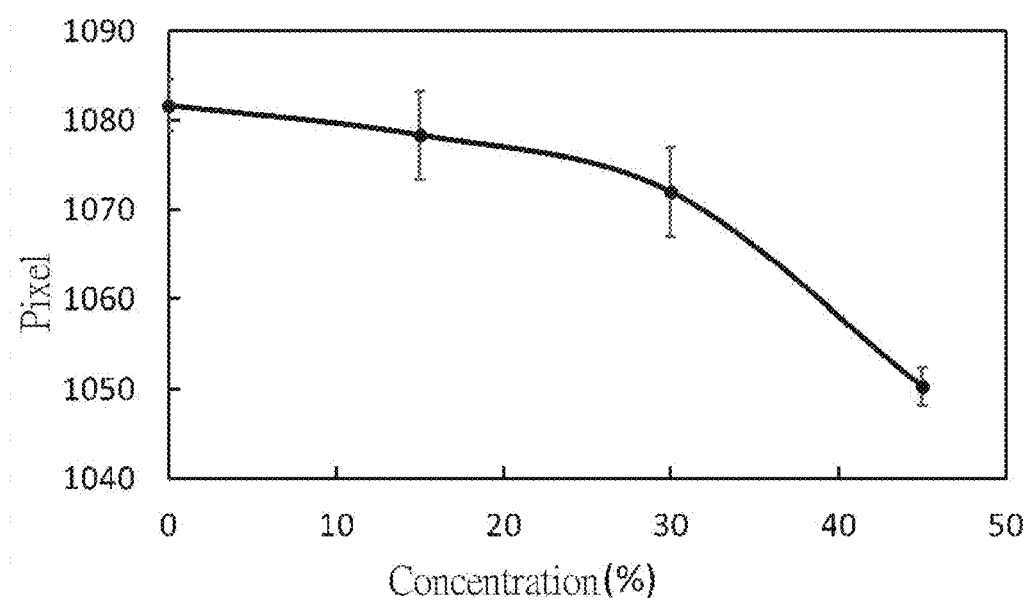

In this experiment, measurement is performed in ascending order of the concentrations, the GMR biosensor is washed before each sample is measured, and each sample is repeatedly measured three times. A 30% sucrose is used as an example. FIG. 7C is a relative transmittance diagram, whose peak corresponds to a pixel 1072, and may correspond to 616 nm based on a relationship diagram between a wavelength and a resonant pixel. This result is close to the result of 615.1 nm obtained by the commercially available spectrometer through measurement. This experiment proves that a resonant wavelength can be obtained based on a pixel corresponding to a transmittance peak. In addition, by observing movement of a pixel corresponding to a peak of relative transmittance, a resonant wavelength shift can be obtained, thus obtaining a sample concentration. FIG. 7D shows a relationship between a sample concentration and a pixel corresponding to a peak of relative transmittance.

Figure 8A:
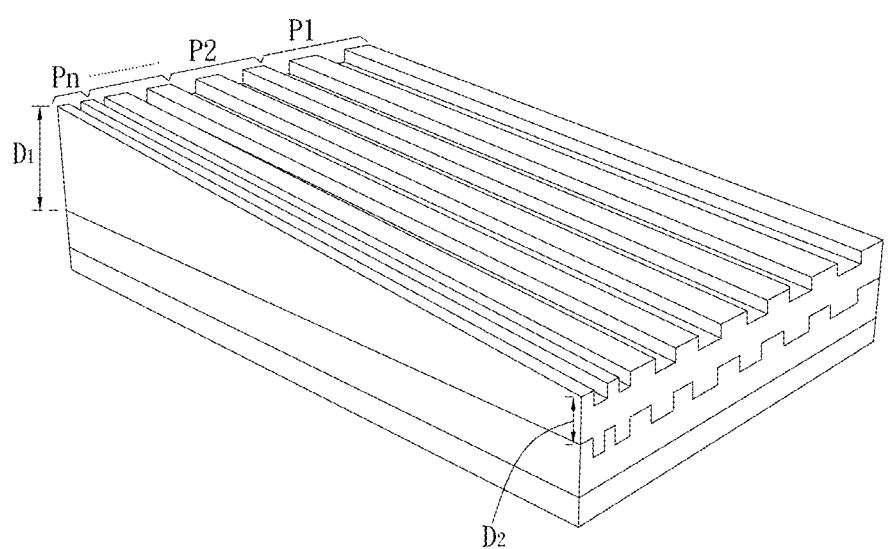
FIG. 8A is a schematic diagram of another embodiment of a guided-mode resonance filter according to the present invention.

In another embodiment of the present invention, a form of the guided-mode resonance filter is modified. As shown in FIG. 8A, the height of the waveguide grating structure of the guided-mode resonance filter 3 gradually increases (the height gradually increases from D2 to D1) or decreases (the height gradually decreases from D1 to D2) along a direction. In this embodiment, a two-dimensional architecture combining a periodic gradient of gratings and the thickness is mainly used, which can achieve measurement for a wide range of resonant wavelengths, and has a high resolution and a smaller size. For example, the guided-mode resonance filter may be designed so that each pixel can correspond to a 1-nm resonant wavelength change. In a thickness gradient direction, a thickness gradient change is made very small, so that each pixel corresponds to a 0.1-nm or 0.01-nm resonant wavelength change, but the present invention is not limited thereto.

Figure 8B:
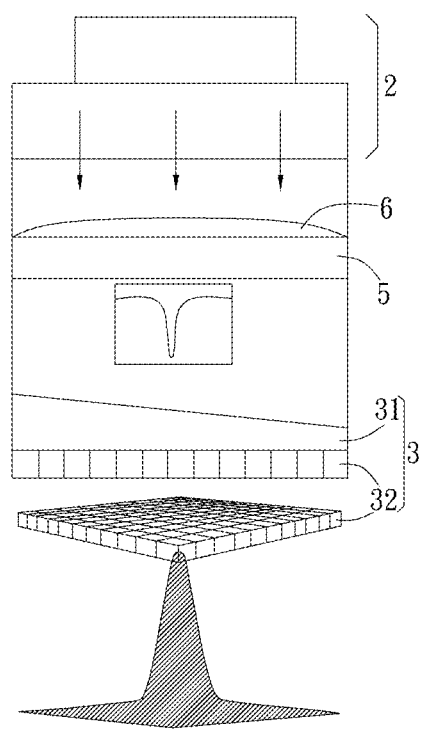
FIG. 8B and FIG. 8C are schematic diagrams of another embodiment using the guided-mode resonance filter in FIG. 8A.

As shown in FIG. 8B, the broadband light source 2 passes through a sample 6 (for example, a sucrose or other biomolecules) and the sensor 5, where transmitted light is a spectrum having a valley. This spectrum passes through the guided-mode resonance filter 31 in this embodiment, and presents intensity distribution having a peak on the photosensitive element 32. A pixel corresponding to the peak is related to a wavelength. When the concentration of the sample 6 is changed, a valley wavelength of the transmitted light is changed, and the pixel corresponding to the peak on the photosensitive element 32 changes accordingly. In this way, the concentration of the sample 6 can be obtained based on the location of the pixel corresponding to the peak.

Figure 8C:
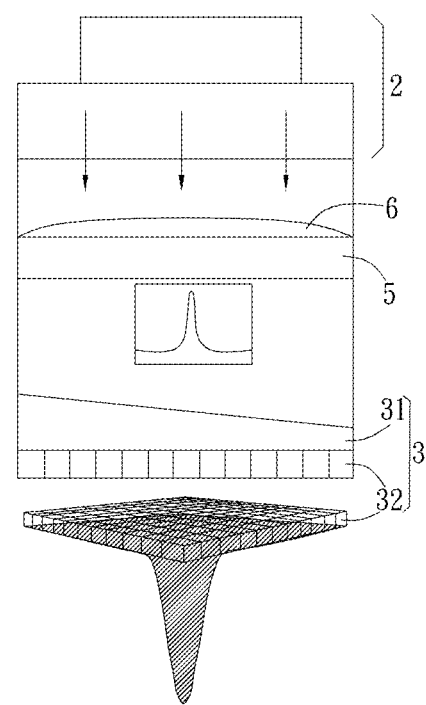

In an embodiment, as shown in FIG. 8C, the broadband light source 2 passes through a sample 6 (for example, a sucrose or other biomolecules) and the sensor 5, where transmitted light is a spectrum having a peak. This spectrum passes through the guided-mode resonance filter 31 in this embodiment, and presents intensity distribution having a valley on the photosensitive element 32. A pixel corresponding to the valley is related to a wavelength. When the concentration of the sample 6 is changed, a peak wavelength of reflected light is changed, and the pixel corresponding to the valley on the photosensitive element 32 changes accordingly. In this way, the concentration of the sample 6 can be obtained based on the location of the pixel corresponding to the valley.

It should be noted that, in the embodiments of FIG. 8A to FIG. 8C, a spectrum corresponding to transmitted light may have a peak or a valley, which differs based on the characteristic of the sensor 5, and has no particular form.

Similarly, the measurement unit of FIG. 8A to FIG. 8C may also be used to measure light reflected by the sensor. The detailed manner and principle are described above, and are not repeated herein.

Figure 9:
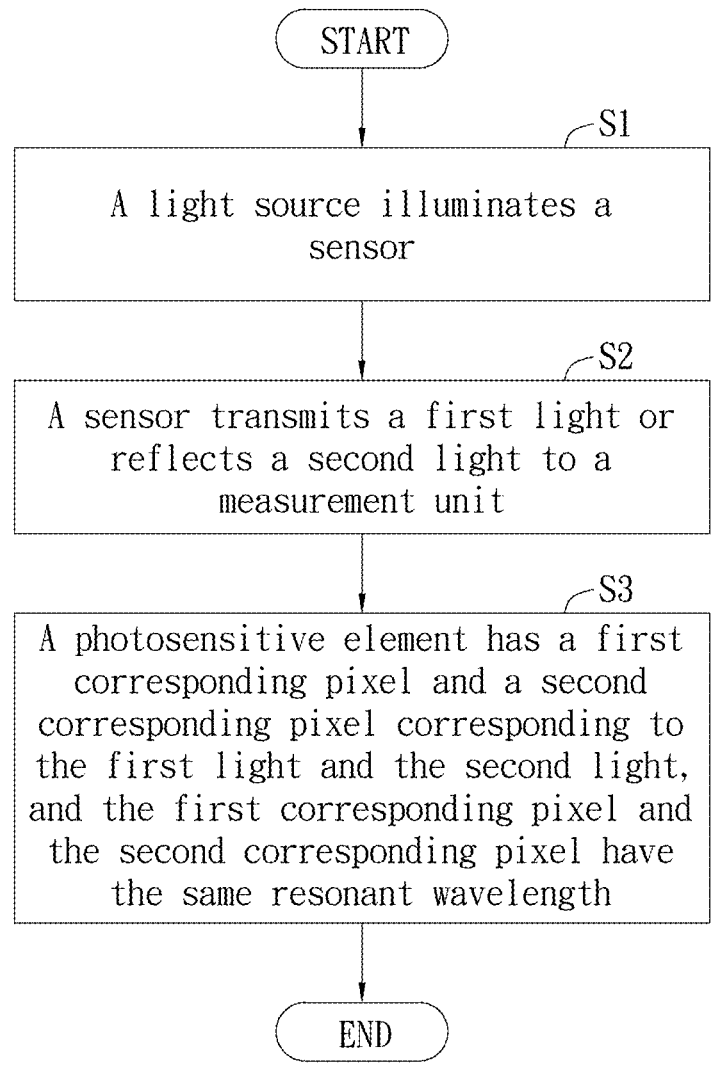
FIG. 9 is a flowchart of an embodiment of the present invention.

Another embodiment of the present invention is a flowchart applicable to the foregoing hardware embodiments. Referring to FIG. 9, a measurement method includes the following steps: (S1) a light source illuminates a sensor; (S2) the sensor transmits first light or reflects second light to a measurement unit; and (S3) a photosensitive element has a first corresponding pixel and a second corresponding pixel corresponding to the first light and the second light, and the first corresponding pixel and the second corresponding pixel correspond to a same resonant wavelength. The measurement principle and the hardware architecture for implementing this method are detailed above, and are not repeated herein.

Compared with the prior art, the resonant wavelength measurement apparatus in the present invention can substitute for a spectrometer to measure a resonant wavelength change, and can also be integrated with a biosensor chip to miniaturize the whole apparatus, resolving the problem of difficult integration of the spectrometer due to a large size. In addition, by means of a two-dimensional gradient architecture, measurement of a higher resolution can be provided.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A resonant wavelength measurement apparatus, comprising:
   a light source; and
   a measurement unit, the measurement unit having a guided-mode resonance filter and a photosensitive element, wherein the photosensitive element is connected to the guided-mode resonance filter;
   wherein the guided-mode resonance filter has a plurality of resonant areas, and each resonant area has a different filtering characteristic, and the guided-mode resonance filter is used to receive a first light transmitted by a sensor or receive a second light reflected by the sensor, wherein the light source includes the first light and the second light,
   wherein when the first light is incident to the guided-mode resonance filter, a first corresponding pixel is determined by measuring intensity distribution on the photosensitive element;
   wherein when the second light is incident to the guided-mode resonance filter, a second corresponding pixel is determined by measuring the intensity distribution on the photosensitive element;
   wherein the first corresponding pixel and the second corresponding pixel correspond to a same resonant wavelength.

2. The resonant wavelength measurement apparatus according to claim 1, wherein the resonant areas are arranged along a direction with a resonant frequency gradually decreasing or increasing.

3. The resonant wavelength measurement apparatus according to claim 1, wherein the guided-mode resonance filter is arranged along a direction with a height gradually decreasing or increasing.

4. The resonant wavelength measurement apparatus according to claim 1, wherein the first light and the second light present a spectrum having a peak or a valley.

5. The resonant wavelength measurement apparatus according to claim 1, wherein the guided-mode resonance filter comprises a waveguide grating structure formed by arranging a dielectric layer on a light transmission layer, wherein a refractive index of the dielectric layer is greater than a refractive index of the light transmission layer.

6. A resonant wavelength measurement method, comprising the following steps:

(S1) illuminating a sensor with a light source;

(S2) transmitting a first light transmitted by the sensor or a second light reflected by the sensor into a measurement unit, wherein the light source includes the first light and the second light, and the measurement unit includes a guided-mode resonance filter and a photosensitive element connected to the guided-mode resonance filter, wherein the guided-mode resonance filter has a plurality of resonant areas, and each resonant area has a different filtering characteristic; and (S3) injecting the first light into the guided-mode resonance filter so as to determine a first corresponding pixel by measuring the intensity distribution on the photosensitive element, and injecting the second light into the guided-mode resonance filter so as to determine the second corresponding pixel by measuring the intensity distribution on the photosensitive element, wherein the first corresponding pixel and the second corresponding pixel correspond to a same resonant wavelength.

7. The resonant wavelength measurement method according to claim 6, wherein the resonant areas are arranged along a direction with a resonant frequency gradually decreasing or increasing.

8. The resonant wavelength measurement method according to claim 6, wherein the guided-mode resonance filter is arranged along a direction with a height gradually decreasing or increasing.

9. The resonant wavelength measurement method according to claim 6, wherein the first light and the second light present a spectrum having a peak or a valley.

10. The resonant wavelength measurement method according to claim 6, wherein the guided-mode resonance filter comprises a waveguide grating structure formed by arranging a dielectric layer on a light transmission layer, wherein a refractive index of the dielectric layer is greater than a refractive index of the light transmission layer.

* * * * *